(12) United States Patent
Hatami-Hanza et al.

(10) Patent No.: US 6,400,857 B1
(45) Date of Patent: Jun. 4, 2002

(54) METHOD FOR MAKING INTEGRATED AND COMPOSITE OPTICAL DEVICES UTILIZING PREFABRICATED OPTICAL FIBERS AND SUCH DEVICES

(76) Inventors: Hamid Hatami-Hanza, 1806-171 Lees Avenue, Ottawa, Ontario (CA), K1S 5P3; Victor Benham, Unit 12, 521 Wilfred Lavigne, Aylmer, Quebec (CA), J9H 5T1

( * ) Notice: Subject to any disclaimer, the term of this patent is extended or adjusted under 35 U.S.C. 154(b) by 0 days.

(21) Appl. No.: 09/400,168

(22) Filed: Sep. 21, 1999

(30) Foreign Application Priority Data

Jan. 11, 1999 (CA) ............................... 2258103
Jun. 10, 1999 (CA) ............................... 2274193

(51) Int. Cl.[7] ................................. G02B 6/12
(52) U.S. Cl. ............................. 385/14; 385/49; 385/15; 385/52; 385/50
(58) Field of Search .................... 385/14, 49, 15, 385/52, 50, 33, 88–94, 31, 37, 59, 8

(56) References Cited

U.S. PATENT DOCUMENTS

| | | | | |
|---|---|---|---|---|
| 4,444,460 A | * | 4/1984 | Stowe | 350/96.19 |
| 4,753,497 A | * | 6/1988 | Fujii et al. | 350/96.15 |
| 5,146,522 A | * | 9/1992 | Pavlath | 385/49 |
| 5,231,683 A | * | 7/1993 | Hockaday et al. | 385/49 |
| 5,337,383 A | * | 8/1994 | DeAngelis et al. | 385/49 |
| 5,393,371 A | * | 2/1995 | Chang et al. | 156/629 |
| 5,502,785 A | * | 3/1996 | Wang et al. | 385/92 |

* cited by examiner

*Primary Examiner*—Mohammad Sikder
(74) *Attorney, Agent, or Firm*—Friedrich Kueffner

(57) ABSTRACT

An integrated optical board (IOB) is made by embedding and securing optical fibers in a substrate, and then excising the ends of the substrate to serve as optical connectors. The remaining part of the substrate may be processed, for example by carving out part or parts of its top layer, to create optical components, such as planar waveguides, therein using the alignment markers for accurate positioning of the waveguide with respect to embedded fiber cores.

18 Claims, 3 Drawing Sheets

METHOD FOR MAKING INTEGRATED AND COMPOSITE OPTICAL DEVICES UTILIZING PREFABRICATED OPTICAL FIBERS AND SUCH DEVICES

FIELD OF THE INVENTION

The present invention relates generally to optical devices, and particularly relates to methods of making devices incorporating prefabricated optical fibers. More particularly, the invention also relates to integrated optic chips (IOCs) with embedded optical fibers and carved-out regions for mounting or creating other components therein.

BACKGROUND OF THE INVENTION

Integrated optic chips consist of different elementary waveguide circuits such as straight waveguides, couplers, branches, and bends. Depending on the type of material used in fabrication of the waveguide they can perform different functions such as light generation, amplification, modulation, splitting and so on. One important family of IOCs are silica-based planar integrated circuit devices that perform mostly passive operations such as coupling, splitting and filtering.

Two exemplary methods for fabricating silica based IOCs are flame hydrolysis and ion exchange, which yield low loss waveguide devices. However, making waveguide grating devices in waveguides made by these methods is difficult and expensive. Waveguide gratings are important for providing functions such as narrow band filtering and adding, dropping and routing wavelengths.

One attractive method for fabricating waveguide devices with gratings is by direct creation (writing) of waveguides by illuminating with electromagnetic radiation exposed areas in a thin film of photosensitive material such as organically modified glasses. However, this technology may not be suitable for mass fabrication and the waveguides made thereby may suffer from excess propagation losses compared with commercially entrenched waveguide fabrication techniques. Another disadvantage is that one-stage fabrication of large area integrated optic circuits with crowded elements is risky and results in low yield and therefore high cost.

Prefabricated standard optical fibers are to date the best known type of optical waveguide to guide light with very low propagation loss. It is also possible to write gratings on optical fibers and utilize them in all-fiber circuits with the desired functions. But a major deficiency of all-fiber circuits is that optical fiber pieces used either as a waveguide or a waveguide with grating are not flexible enough to be connected together in a compact form. Moreover, some of the optical elements cannot be made using fibers consistently. A desirable integrated optic technology would offer the necessary flexibility to make some of the optical elements that are difficult to build with fibers while also providing optical connection at the board level utilizing the flexibility of integrated optical waveguides.

A reliable and economic technology that can offer the advantages of both all-fiber made devices and the flexibility of planar optical waveguides for optical interconnection and the fabricating of those devices that are best implemented by planar waveguides, such as branches and couplers, is desirable. It is also desirable to have the capability of fabricating the optical elements in successive independent stages, possibly from different materials and with different processes.

Regardless of the fabrication method of an integrated optic circuit on a substrate there is the problem of attaching fibers to waveguides in an economical way. The prior art has addressed the subject of how to attach a fiber to a waveguide. The best known method of attaching fibers to waveguides uses etched V-grooves to position the fiber in front of the waveguide. For instance, in U.S. Pat. No. 5,175,781 "Attaching Optical Fibers To Integrated Optic Chips", issued Dec. 29, 1992 to Hockaday et al., there is disclosed a method of attaching fiber to integrated optic chips by forming aligning grooves, using laser ablation, on the IOC followed by cutting the surface ends of the waveguides by a dicing saw and then disposing the optical fibers within the grooves and securing them with adhesives to attach the fibers to the IOC permanently. Disadvantages of such methods are that they are labour intensive, cannot assure perfect alignment of fibers and planar waveguides in all directions, and that they introduce excess losses due to a mismatch between the core size of the optical fiber and the waveguide. It is therefore also desirable to provide a method of attaching fibers to a waveguide circuit which is less time consuming, has lower excess loss, is more reliable, and is amenable to being automated.

SUMMARY OF THE INVENTION

The present invention endeavours to mitigate some of the above-mentioned problems of IOC fabrication.

In the present invention, optical fibers are first embedded in a substrate and are precisely placed in predetermined positions by lithography, molding, laser, chemical or mechanical micromachining, their positions being readable with the aid of markers on the front and possibly back surfaces of the substrate defining a metric system for locating the fibers precisely in both lateral directions. The fibers are affixed in the grooves by adhesives or the like; then strips of the substrate with fibers embedded therein are cut from the left and right sides. The left and right separated sections, with the embedded fibers and extra lengths of loose fibers protruding beyond the edges of these sections, are end polished, if necessary, and kept for later re-attachment to the substrate with the embedded fibers used as the input/output connectors. The remaining section, referred to here as "Integrated Optical Board" (IOB) when finished, is then carved to an appropriate depth in designated areas and filled or coated (by dip coating or other methods) with layers of suitable materials from which a waveguide device can be fabricated. The waveguide will connect the input/output fibers optically with the patterns of waveguide circuits by using the markers to find the exact location of the embedded fibers in the IOB. Alternatively different areas of the carved IOB can be filled or coated with different materials such that the waveguide devices made of these material will perform different functions. If necessary, using a dicing saw, the end faces of the embedded fibers and the fabricated waveguides are cut and polished at an angle to reduce the coupling losses and optical reflection from the interfaces of sections with different refractive indexes. Having completed the optical interconnection of the different points in the IOB, the two right and left connectors are re-attached to the IOB by perfectly aligning the end faces of the fibers inside the connectors and the fibers inside the IOB.

Thus, fast or automatic alignment of fibers to IOCs is achieved. Further, fiber based devices are easily integrated with planar optical waveguides in one substrate.

In a method aspect of the present invention an optical fiber is first secured in a groove in the surface of an optic substrate, which is subsequently processed to create requisite integrated optic components in portions thereof.

After the optical fiber has been secured in the groove, opposite optic substrate ends may be excised to serve as optical connectors to the remaining central portion after its processing has been completed. For convenience, the central portion, once processing has completed, is hereafter refereed to as an integrated optic board (IOB).

In a preferred aspect of the present invention, the central portion of a substrate, having embedded fibers therein, is processed by: polishing or removing its top layer all down to the top of the fibers' cores; carving out a predefined region, or regions, in its top layer down to a depth at least exposing part of the fibers' cores; and filling or coating the carved out region, or regions, with an optical material or materials in one or more layers, one of which may be photosensitive, for creating a planar optical waveguide or other optical components therein; thereby providing an IOB interconnectable to other devices through the embedded optical fibers.

The step of removing the top layer off may be omitted at the risk of increasing the tolerance in the depth of the carved out region.

The method of the present invention also incorporates applying a plurality of surface markers to the optic substrate prior to processing for subsequent alignments.

An optical device according to the present invention comprises at least an IOB having an integrated optic component therein and an embedded optical fiber and a connector also having an embedded optical fiber characterized in that both the IOB and the connector were excised from the same or similar optic substrate after the optical fiber has been embedded therein, thereby providing optimal alignment between connector and IOB.

In another device aspect, the present invention provides an integrated optic chip, comprising: a planar optical waveguide in at least one upper layer region of an optic substrate; and an optical fiber fully embedded in another upper layer region of the optic substrate and coupled at one end thereof to one end of the planar optical waveguide.

BRIEF DESCRIPTION OF THE DRAWINGS

The preferred embodiments of the present invention will now be described in detail by way of example with reference to the accompanying drawings, in which.

DETAILED DESCRIPTION OF THE PREFERRED EMBODIMENTS

Figure 1:
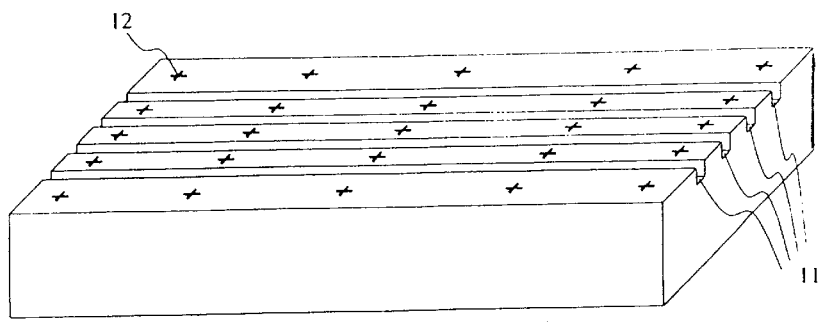
FIG. 1 is a perspective view of a substrate with grooves and markers in its surface according to the present invention.

Referring to FIG. 1 of the drawings, it shows a substrate 10, four grooves 11 along one of its dimensions in the surface thereof, and a plurality of surface markings 12 on the surface islands on either side of the grooves 11. Markings may also be provided on the opposite surface of the substrate 10. Preferably, the substrate 10 is made from phosphorous doped silica glass to facilitate etching by a solution of hydrofluoric acid, if such is used. But, of course, other types of substrate such as silicon, lithium niobate or other desirable materials and other types of chemical etching or laser ablation, etc. may be used after using well-known lithography techniques (see, for example, "Introduction to Microelectronic Fabrication, Modular Series on Solid State Devices," by Richard C. Jaeger, editors; Gerold W. Neubeck, Robert F. Pierret, Addison-Wesley Publishing Company, vol. 5, 1993.).

The grooves 11 are made, for example by etching, to a depth sufficient to firmly accommodate the fibers 13 (shown in FIG. 2) inside them. Preferably, the grooves 11 have a depth that is slightly larger than the outer diameter of the fibers 13 in order for them to be buried completely inside the grooves 11. In order to minimize stresses due to differences in thermal expansion, the characteristic parameters of the substrate 10 should be as close as possible to those of the fibers 13. The markers 12 are necessary in order to provide optical alignment of other components with the fibers 13.

Figure 2:
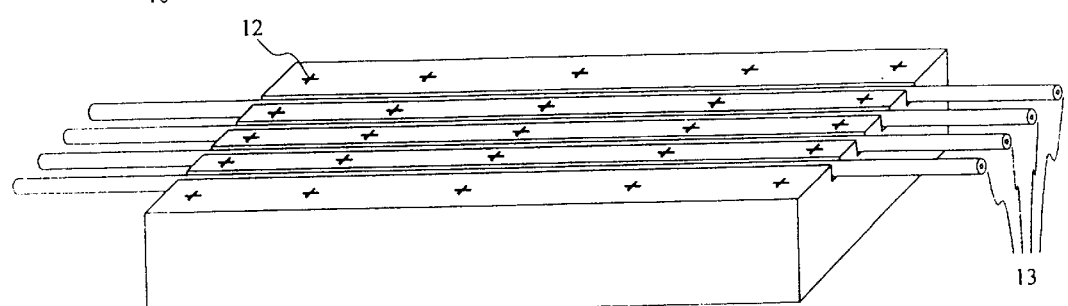
FIG. 2 is a perspective of the substrate on FIG. 1 with optic fibers placed in the grooves with the fiber ends protruding from opposite sides of the substrate.

FIG. 2 shows the substrate 10 with the fibers 13 embedded in the grooves 11. As may be seen in the figure, the fibers 13 protrude beyond either edge of the substrate 10. After placing them in the grooves 11, the fibers 13 are held firmly in place and completely covered with an adhesive, such as sol-gel liquid glass or the like. Again the characteristic parameters, such as thermal expansion coefficient and refractive index, of the adhesive should be close to those of the substrate 10 and the fibers 13. Of course, prior to applying the adhesive, the substrate 10 is washed with a suitable chemical solvent (see the above cited reference).

Figure 3:
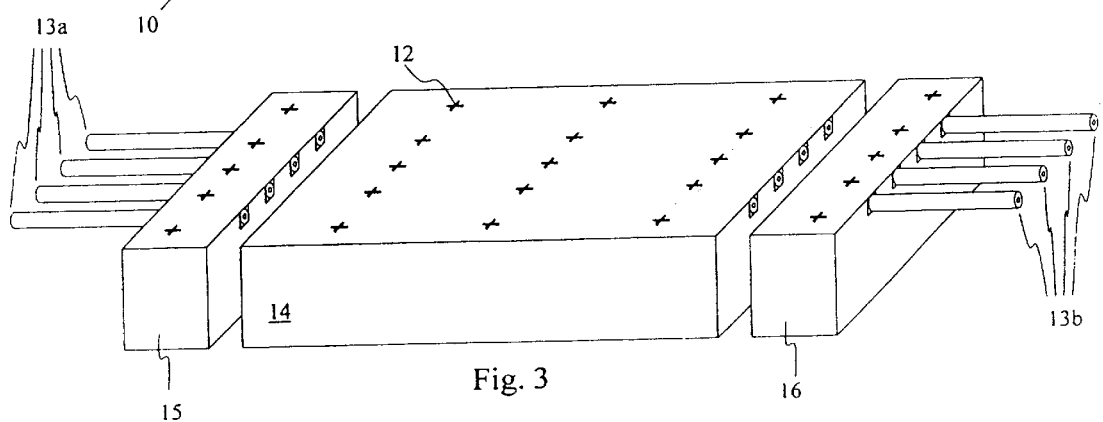
FIG. 3 shows the substrate of FIG. 2 having two strips cut therefrom to form two (left and right) connectors.

The result of the next step in the process is shown in FIG. 3, where two strips adjacent the fibers 13 ends have been cut to provide two optical fiber connectors, the left connector 15 and the right connector 16, with fiber ends 13a and 13b protruding from the former and the latter, respectively. The surfaces of the connectors 15 and 16 opposite the protruding fibers 13a, 13b are polished, if necessary, and the connectors kept for later attachment to the central portion 14, or another similar central portion, which once processed forms the IOB.

Figure 4:
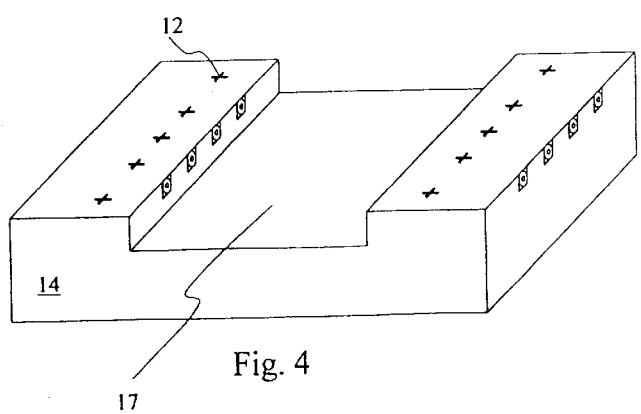
FIG. 4 shows the central portion of the substrate of FIG. 3 after a central region thereof has been carved out to accommodate optical component.
Figure 5:
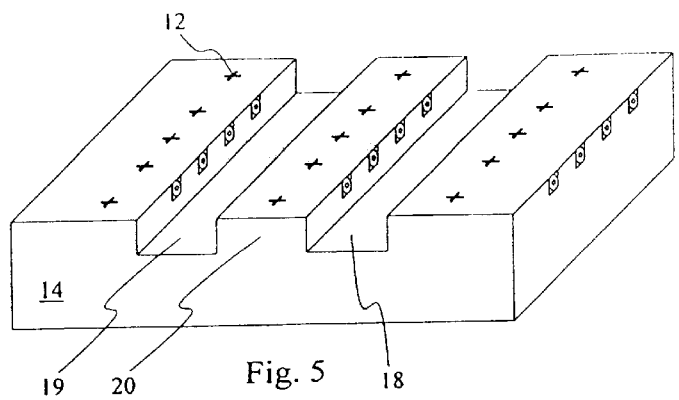
FIG. 5 shows the central portion of the substrate of FIG. 3 after two regions on either side of the centre have been carved out to accommodate two optical components.

Having excised the connectors 15 and 16 from the substrate 10, the IOB 14 is now ready for further processing. FIGS. 4 and 5 show two embodiments of how to process the substrate 10 further. In FIG. 4 one central portion 17 is carved out, while in FIG. 6 two portions 18 and 19, on either side of a central island 20 are carved out, and polished such that the cut input/output fiber core ends are at least fully exposed. The usual dicing saw is used for this step of the process, as is normally used for cutting and polishing the end-faces of the fibers (at the desired angle with respect to the fiber axis). However, other methods such as wet etching or reactive ion etching (RIE) may be used to provide the carved out portion.

Figure 6:
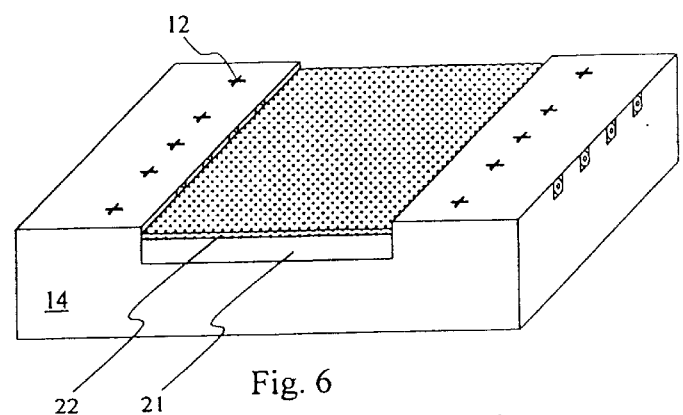
FIG. 6 shows the substrate of FIG. 4 in which the carved out region is shown filled or coated with two layers, at least one of which being photosensitive.
Figure 7:
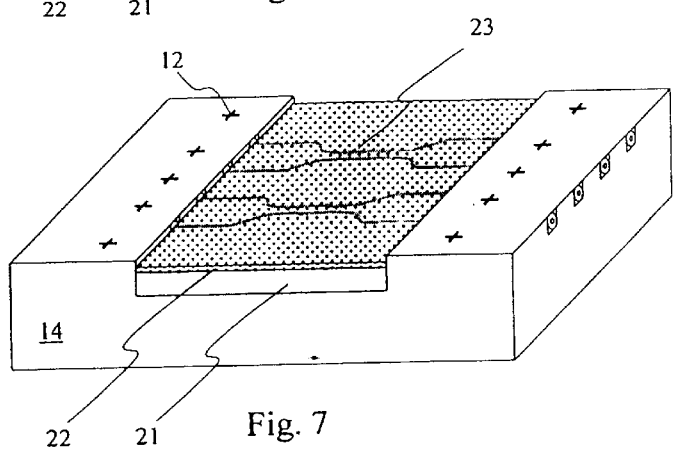
FIG. 7 shows the substrate of FIG. 6 with the upper layer having planar waveguides.
Figure 8:
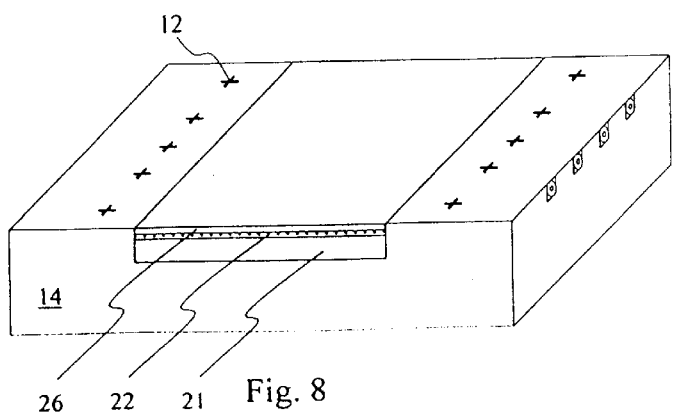
FIG. 8 shows the substrate of FIG. 7 with an upper cladding layer covering the planar waveguide layer.

Now an exemplary step of providing a planar wave-guide in the carved out portion 17 of the IOB 14 will be described with reference to FIGS. 6 and 7. The carved area 17 is filled or coated with layers 21 and 22 of silica glass or other suitable and desirable material from which the waveguide 23 circuit is going to be made. The layers 21 and 22 can be deposited for instance using flame hydrolysis, or by filling or coating and drying the area with layers of liquid glass such as sol-gel solution. The mask that is used to fabricate and imprint the waveguide 23 circuitry with a group of input and output waveguides will closely match these waveguides with the embedded fibers 13 using the markers 12. The input/output waveguide distances are standard and equal to the distance of the embedded fibers. Markers 12 ensure that the input/out waveguides are aligned with the embedded fibers. As shown in FIG. 8 a third or upper cladding layer 26 may be provided on top of the middle layer 22 before or after the waveguides 23 have been made. Two example methods of fabricating waveguides in the carved out areas 17, 18 and 19 are given below.

The first method uses flame hydrolysis to deposit a layer 21 of silica glass on the carved out area as a lower cladding followed by depositing another layer 22 with slightly higher refractive index as the core layer. Flame hydrolysis deposition has been described for example in "Optical Fiber Communications," John M. Senior, Prentice Hall International Series, Ch.4, 1992. The surface level and thickness of the cladding and core layer are adjusted to align and match the core layer with the core region of the embedded fibers 13 in order to minimize the coupling loss. The waveguide 23 circuit is then fabricated by lithography and reactive ion etching or any other suitable method. Using the markers 12 ensures the optical alignment of the waveguides 23 axis with the embedded fiber 13 axis by aligning the markers on the waveguide circuitry mask with the pre-imprinted standard markers 12 on either side of the IOB 14. After fabricating the waveguide 23, an upper cladding layer 26 (as shown in FIG. 8) may also be deposited on the waveguides to shape the mode field as close as possible to that of the fiber. For example, the waveguide core could be 8 microns wide with the index difference between the cladding layer and the core layer about 0.28 percent; while the fibers would be single mode fibers with 125 micron outer diameter and 9 micron core diameter.

In another example method of fabricating waveguides the carved area 17 is filled or coated with layers of sol-gel solution for lower cladding, core, and upper cladding. Sol-gel glass is a liquid solution form of an organically modified glass from which one can make thin or thick layers of glass after drying the sol-gel. One convenient method of fabricating waveguides using sol-gel is direct writing of the waveguide by a contact mask on a photosensitive sol-gel containing photo initiators. However, one can also use other techniques such as etching to fabricate ridge waveguides and then cover them with a cladding layer. Different techniques of fabricating optical waveguides have been described, for instance, in the article "Fabrication and Characterization of Low-Loss, Sol-Gel Planar Waveguides", Anal. Chem, pp. 1254–1263, Vol. 66, 1994; and in another article "Ultraviolet light imprinted sol-gel silica glass channel waveguides on silicon", SPIE, 38–41, vol. 2695, 1996. The carved area 17 may be filled or coated with a non-photosensitive sol-gel and then dried with the associated drying method as the lower cladding 21. This is followed by depositing another layer of sol-gel as the core layer 22. The core layer 22 might be photosensitive in which case its refractive index will increase upon exposing to certain electromagnetic radiation such as ultraviolet (UV) radiation. The surface level and thickness of the cladding and core layers 21 and 22 are adjusted to align and match the core layer with the core region of the embedded fiber 13 in order to minimize the coupling loss. The mask carrying the waveguide circuitry will then be aligned with respect to the markers 12 to ensure the automatic optical alignment of the fabricated waveguide to the embedded fibers. This requires a mask which has openings corresponding to a number of the markers 12 and the pattern of the waveguide 23 in alignment with the input/output group of fibers 13. The waveguide is fabricated either by UV imprinting or other suitable methods in the layer of the photo-sensitive sol-gel such that the mask's markers are in full alignment with those (12) already imprinted on the substrate 10. Preferably another layer of sol-gel glass will cover the waveguide as the upper cladding layer 26 in FIG. 8. Referring back to FIG. 5 in particular, each of the two carved areas 18 and 19, can be used independently to fabricate a waveguide circuitry according to the above described methods. For instance, the fibers in the island 20 may be used as arms of a Mach-Zhender interferometer. It is also possible to fabricate a grating on these embedded fibers in a Mach-Zhender configuration to achieve a multiple add/drop device. In addition, the materials and the fabrication technologies that are used for each carved area can be different. Those skilled in the art can easily adapt other fabrication methods of waveguide circuitry, or use other materials and architectures different from the present invention without departing from the scope thereof.

Figure 9:
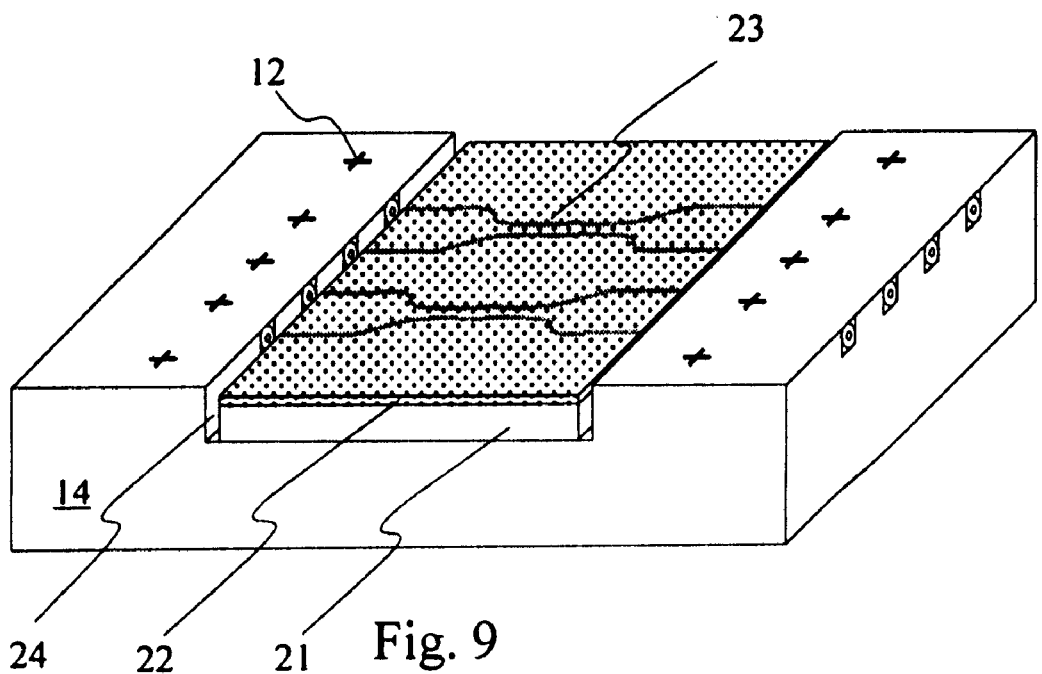
FIG. 9 shows an alternative embodiment wherein the substrate of FIG. 7 is further processed to provide auxiliary grooves cut between the waveguide ends and the optical fiber ends.

Referring now to FIG. 9, it shows an embodiment of the invention wherein after fabrication of the waveguides 23 a dicing saw is used to make an auxiliary groove 24 almost perpendicular to the waveguide and fiber axes in order to remove imperfectly fabricated parts of the waveguide circuit in areas immediately adjoining the embedded fibers. (A dicing saw will also polish the end faces of the waveguides and fibers.) The auxiliary groove 24 may or may not be filled with an index matching material.

Figure 10:
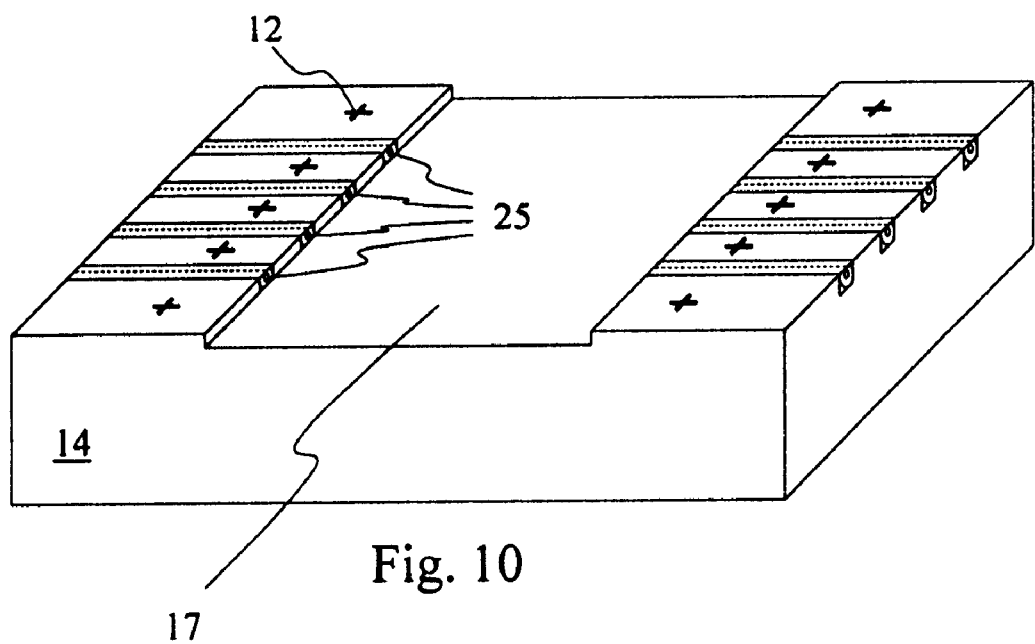
FIG. 10 shows the substrate of FIG. 3 wherein the top layer has been polished (or removed) down to the top of the fibers' cores and wherein a central portion of the substrate (or IOB) is carved out (for example, by RIE) to just expose part of the optical fibers' cores.

FIG. 10 shows an embodiment wherein the top layer of the IOB 14 has been polished (or otherwise removed) such that the cores of the fibers are just exposed and where the central portion 17 has being carved out, using RIE (reactive ion etching) or other suitable methods, to expose, in cross-section, at least part of the fibers' 13 cores 25, such that the depth of the carved out portion is about the core diameter. This is useful since it enables control of the depth of the carved area very well using RIE. In this way the carved area is filled or coated with only one layer, while the depth of the carved area is precisely controlled. This method decreases the uncertainty when it is required to fill or coat the carved area to an exact thickness with the desired material.

What is claimed is:

1. A method of making an integrated optical chip (IOC) including the steps of:

a) securely embedding an optical fiber in a layer of an optic substrate;

b) processing a predetermined region of said substrate to provide said IOC; and c) excising, transversally to said optical fiber, an end portion of said optic substrate to serve as optical connector to said IOC.

2. The method as defined in claim 1, wherein said optical fiber protrudes beyond at least one edge of said optic substrate.

3. The method as defined in claim 1, wherein said end portion has the optical fiber protruding therebeyond.

4. The method as defined in claim 2, wherein said optical fiber protrudes beyond edges, of said optic substrate.

5. The method as defined in claim 4, further comprising the intermediate step of: excising, transversally to said optical fiber, two end portions, at said opposite edges of said optic substrate to serve as optical connectors to said IOC.

6. The method as defined in claim 5, wherein said predetermined region of said surface layer is carved out to such depth to at least expose, in cross-section, part of the core of said optical fiber.

7. The method as defined in claim 6, wherein a waveguide is formed within the carved out predetermined region.

8. The method as defined in claim 7, wherein said waveguide is aligned with the optical fiber core by means of aligning markers.

9. The method as defined in claim 8, wherein said aligning markers define a metric grid for positioning a plurality of parallel grooves made in said top surface layer before applying step (a) in claim 1.

10. The method as defined in claim 1 wherein step (b) includes removing the top surface layer to just expose said optical fiber's core.

11. The method as defined in claim 10, further including the step of carving out said predetermined region of said surface layer to such depth to at least expose, in cross-section, part of the core of said optical fiber.

12. The method as defined in claim 6, wherein a waveguide is formed within the carved out predetermined region by depositing one or more layers, at least one of which is photosensitive, and wherein said waveguide is formed by exposing the photosensitive layer to electromagnetic radiation in the carved out region.

13. The method as defined in claim 11, wherein a waveguide is formed within the carved out predetermined region by depositing one or more layers, at least one of which is photosensitive, and wherein said waveguide is formed by exposing the photosensitive layer to electromagnetic radiation in the carved out region.

14. The method as defined in claim 6, wherein at least one layer is deposited by dip-coating.

15. The method as defined in claim 12, wherein at least one layer is deposited by dip-coating.

16. The method as defined in claim 13, wherein at least one layer is deposited by dip-coating.

17. The method as defined in claim 12, wherein said waveguide is aligned with the optical fiber core by means of aligning markers.

18. The method as defined in claim 17, wherein said aligning markers define a metric grid for positioning a plurality of fibers embedded in the optic substrate.

* * * * *